United States Patent [19]
Lohr

[11] 4,198,071
[45] Apr. 15, 1980

[54] TOY VEHICLE

[76] Inventor: Raymond J. Lohr, 5043 Sterrettania Rd., Erie, Pa. 16506

[21] Appl. No.: 930,418

[22] Filed: Aug. 2, 1978

[51] Int. Cl.² .................................................. B62M 29/00
[52] U.S. Cl. .............................. 280/218; 280/226 R; 280/252
[58] Field of Search ............... 280/220, 221, 223, 224, 280/225, 226 R, 226 A, 227, 252, 218, 1.181

[56] References Cited
U.S. PATENT DOCUMENTS

| | | | |
|---|---|---|---|
| 789,868 | 5/1905 | McGowan | 280/225 |
| 2,002,046 | 5/1935 | Scholtes | 280/252 X |
| 2,081,750 | 5/1937 | Laborda | 280/218 |
| 3,337,239 | 8/1967 | Huffman | 280/218 |
| 3,399,906 | 9/1968 | Portnoff | 280/221 |
| 3,979,135 | 9/1976 | Meritzis | 280/226 R |

FOREIGN PATENT DOCUMENTS 654743  10/1948  United Kingdom ..................... 280/252

*Primary Examiner*—John A. Pekar
*Attorney, Agent, or Firm*—Charles L. Lovercheck

[57] ABSTRACT

A rider propelled vehicle having a steerable front assembly with a longitudinally extending rack fixed to it. A rear assembly having a sleeve slidably supported on the rack which supports a rear axle. A pinion is rotatably supported by the rear axle. The rider sits on the rear assembly and reciprocates the front assembly with his feet, causing the rack to reciprocate relative to the axle rotating the axle through a sprocket and one-way clutch.

9 Claims, 4 Drawing Figures

TOY VEHICLE

OBJECTS OF THE INVENTION

An object of the present invention is to provide a rider propelled toy vehicle which may support the rider in a seated position.

Another object of the invention is to provide a toy vehicle propelled by the movement of the operator's hands and feet on the vehicle without contact with the ground.

Another object of the invention is to provide a rider powered vehicle which is easily propelled.

Another object of the invention is to provide a simplified rack and pinion drive for a toy vehicle.

Another object of the invention is to provide a rack and pinion driving mechanism that has relatively few parts.

Another object of the invention is to provide a strong rigid structure which is not easily damaged by the bumping and jarring of children at play.

Another object of the invention is to provide a driving mechanism which may be incorporated in vehicles of various types and which may be easily operated by the foot or otherwise to meet desired conditions of application and use.

Another object of the invention is to provide a toy vehicle of novel construction, attractive in appearance and which requires a certain amount of skill in its operation.

Another object of the invention is to provide a self-propelled foot propelled vehicle without the expense and potential danger to the child of rotating pedals.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
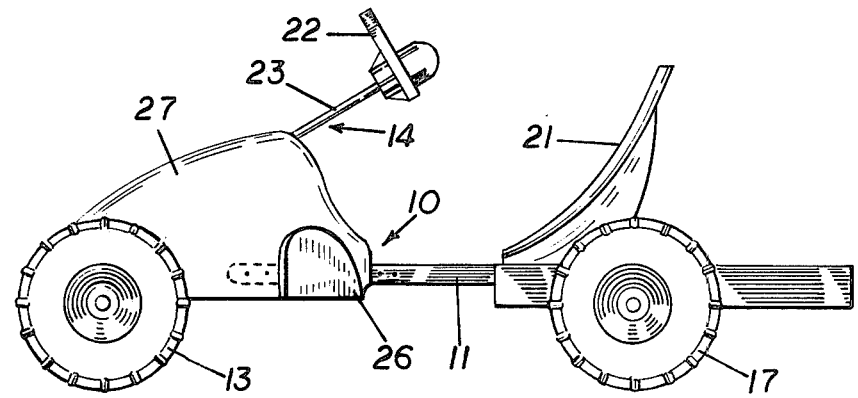
FIG. 1 is a side view of the toy vehicle in its retracted position.
Figure 2:
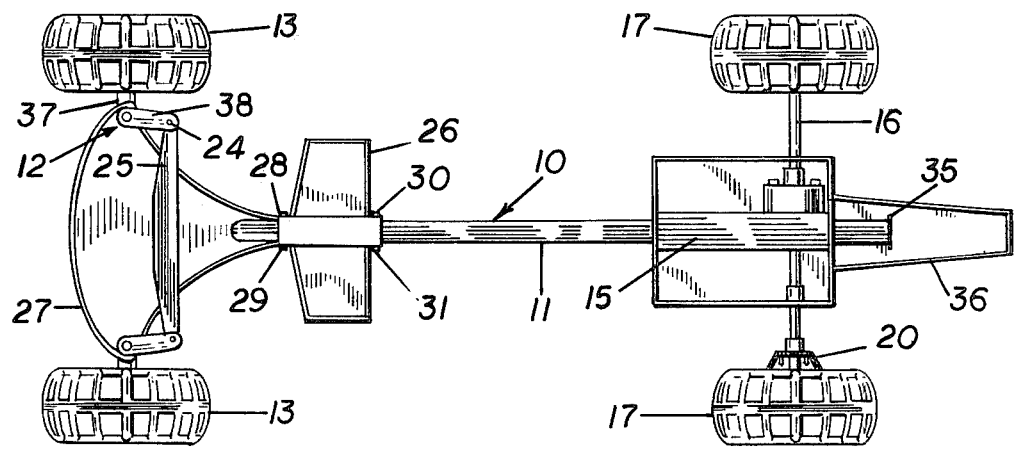
FIG. 2 is a side view of the toy vehicle in its extended position.
Figure 3:
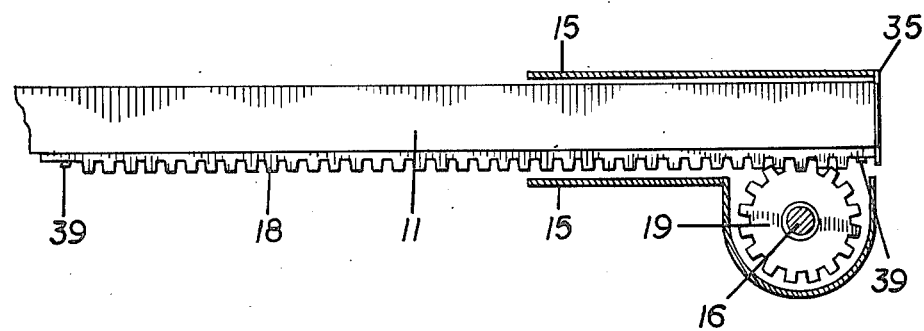
FIG. 3 is an enlarged side view of the drive mechanism.
Figure 4:
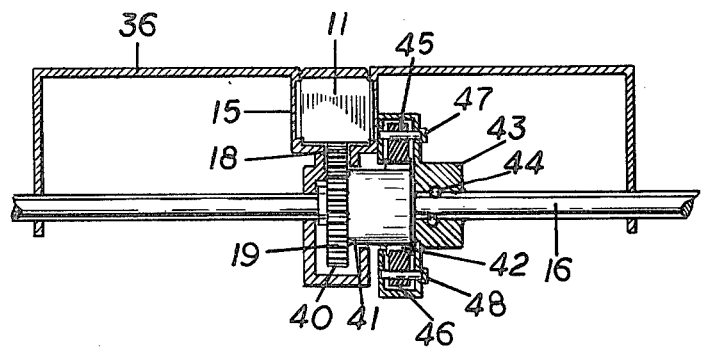
FIG. 4 is an enlarged end view of the drive mechanism.

Now, with more particular reference to the drawings. The present invention discloses a toy vehicle 10 which may be in the shape of a car, a go-cart, or a tractor.

The toy vehicle has an elongated support member 11 of a material sufficiently strong to rigidly support said vehicle. At one end of the support member 11 there is a first body portion 27 suitably attached to the support member 11.

First wheels 13 are rotatably supported on first wheel support means 12 which are provided one at each side of the vehicle. The wheel support means have short axle members 37 which rotatably support the first wheels 13. The short axle member is rotatably attached to the first body portion 27 and rigidly attached to the steering link 38. The steering link 38 is rotatably attached by the steering knuckle 24 to the connecting rod 25.

Conventional steering means are provided at the first end of support member 11, whereby first wheels 13 can be steered by turning steering wheel 22 on steering column 23 which is attached to steering knuckles 24 through connecting rod 25.

Suitable foot holds 26 are formed on the first body portion 27 and are positioned so as to be comfortable for an infant driver.

The support member 11 is rigidly attached to the first body portion 27 by means of nut 28 and bolt 29, which pass through the support member 11 and the first body portion 27. The length of the car can be adjusted by means of loosening the nut 28 from the bolt 29 and moving the support member 11 forwardly or rearwardly to the desired length. The first body portion 27 encloses the first end of the support member 11 throughout the range of its adjustment whereby the support member 11 does not present a hazard to children at play. Nut 30 and bolt 31 can also be provided which pass through the first body portion 27 and the support member 11 to assure a rigid fit.

The support member 11 can be made of a tube, square in cross-section, having the outwardly bent sides 35 at its extreme second end. A sleeve member 15 is slidably attached to the support member 11 at its second end. The outwardly bent sides 35 of the support member 11 engage the end of the sleeve 15 to limit the travel of the sleeve in a first direction and the end of the support member will engage a second body portion 36 to limit the travel of the sleeve in a second direction.

The support member has a rack 18 attached to its second end. The rack 18 may be attached by bolts 39 to the support member. The sleeve 15 has the second axle 16 rotatably supported. The second axle has a pinion 19 rotatably attached to it which is aligned so as to engage the rack 18 when the sleeve is moved back and forth. The second axle also has second wheels 17 rotatably attached thereto.

The pinion 19 has teeth 40 around its circumference and a rachet member 41 rigidly attached to one of its sides. The rachet member 41 is disposed around and spaced from the axle 16. The member 41 has rachets 42 disposed about its outer surface. A shell member 43 is rigidly attached to the axle 16 by a swaging or keyway 44. The shell member 43 has rachet dogs 45 and 46 retained by pin bearings 47 and 48. The rachet dogs 45 and 46 engage the rachets 42 when the pinion 19 is moved in a first direction and the rachet dogs 45 and 46 slip over the rachets 42 when the pinion 19 is moved in a second direction.

A one-way clutch 20 can be rigidly attached to the second axle 16 to engage one of the second wheels 17 when the sleeve 15 is moving relative to the support member 11 in a first direction. This one-way clutch will disengage the second wheels permitting the pinion to rotate in the opposite direction while the vehicle continues its forward motion as the sleeve is moved relative to the rack on the support member in a second direction.

The sleeve 15 has a second body portion 36 attached thereto which surrounds the sleeve and second end of the support member 11 protecting infants from the moving members.

A seat 21 can be supported on the upper side of the second body portion 36 which is attached to the sleeve member 15.

An infant seated on the seat 21 in the toy vehicle can grasp the steering wheel 22 with his hands and place his feet on the foot holds 26 and by pushing with his feet, can run the pinion 19 over the rack 18, thereby propelling the toy vehicle 10 with a power stroke. By pulling on the steering wheel 22 and sliding the seat along the support member 11, the infant will move the apparatus through a return stroke and return the rack and pinion into position for another power stroke. The steering means 14 has a steering wheel 22, which is rigidly attached to a steering column 23. The steering column 23 is movably connected to the connecting rod 25.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A toy vehicle (10) comprising,
   a support member (11),
   first wheels (13) rotatably attached to a first end of said support member (11) by first wheel support means (12, 34),
   a sleeve (15) disposed about a second end of said support member (11) and generally concentric thereto,
   a second axle (16) rotatably attached to said sleeve (15),
   second wheels (17) attached to said second axle (16),
   a rack (18) attached to said support member (11) at said second end,
   a pinion (19) engaging said rack and rotatably attached to said second axle (16),
   one way clutch means connecting said pinion to said second axle whereby an operator can move said support member (11) forward relative to said sleeve (15), thereby providing a power stroke moving said rack (18) relative to said pinion and rotating said pinion (19) and rotating said second axle (16) and said second wheels (17) driving said vehicle forward, said operator can then move said support member (11) rearward relative to said sleeve (15), thereby providing a return stroke.

2. The toy vehicle disclosed in claim 1 wherein said clutch means is a one-way clutch attached to said second axle (16) and to said pinion whereby said second axle will be rotated during said power stroke and said axle will not be rotated during said return stroke.

3. The toy vehicle disclosed in claim 1 wherein a steering means (14) is connected to said first wheels (13).

4. The toy vehicle disclosed in claim 1 wherein a seat (21) is attached to said sleeve (15).

5. The toy vehicle disclosed in claim 1 wherein foot hold means (26) and hand hold means are attached to said support member (11) and a seat (21) is attached to said sleeve (15) whereby an operator seated on said seat (15) with his feet and hands engaging said foot hold means (26) and hand hold means can move said support member (11) forward relative to said seat (21) and said sleeve (15), thereby moving said rack (18) relative to said pinion (19) and rotating said pinion (19) and rotating said second axle (16) and second wheels (17) driving said vehicle forward,
   said operator can also move said support member (11) rearward relative to said seat (21) on said sleeve (15).

6. The toy vehicle disclosed in claim 1 having a front body section (27), and a rear body section (36),
   said forward body section enclosing a front portion of said support member (11) and said rear body section (36) enclosing a rear portion of said support member (11), said rear body section (36) being attached to said sleeve (15), whereby said forward body section (27) and said rear body section (36) will move relative to each other along said support member (11).

7. The toy vehicle disclosed in claim 1 wherein the support member (11) is square in cross-section.

8. The toy vehicle disclosed in claim 1 wherein the first wheel support means comprises an axle.

9. The toy vehicle disclosed in claim 1 wherein the first wheel support means comprises short axle members rotatably supported in a first body part.

* * * * *